United States Patent [19]
Sugiura et al.

[11] Patent Number: 5,695,704
[45] Date of Patent: Dec. 9, 1997

[54] METHOD FOR CRIMPING A THERMOPLASTIC RESIN MEMBER

[75] Inventors: Hironobu Sugiura, Kanagawa-ken; Masayuki Suzuki; Kouichi Sato, both of Shizuoka-ken, all of Japan

[73] Assignee: NHK Spring Co., Ltd., Yokohama, Japan

[21] Appl. No.: 610,767

[22] Filed: Mar. 4, 1996

Related U.S. Application Data

[63] Continuation of Ser. No. 217,585, Mar. 24, 1994, abandoned.

[30] Foreign Application Priority Data

Mar. 24, 1993 [JP] Japan .................. 5-090930

[51] Int. Cl.$^6$ .................. B29C 35/08; B29C 33/02
[52] U.S. Cl. .................. 264/249; 264/274; 264/296; 264/322; 264/445
[58] Field of Search .................. 264/249, 255, 264/259, 274, 275, 293, 294, 296, 320, 322, 327, 266, 254, 445; 425/383, 385, 395, 112, 519

[56] References Cited

U.S. PATENT DOCUMENTS

| | | | |
|---|---|---|---|
| 3,754,319 | 8/1973 | Miori | 264/249 |
| 4,130,623 | 12/1978 | Walter | 264/293 |
| 4,217,084 | 8/1980 | Jacques et al. | 264/293 |
| 4,340,560 | 7/1982 | Migeon | 264/249 |
| 4,859,378 | 8/1989 | Wolcott | 264/249 |
| 4,950,442 | 8/1990 | Tanimoto et al. | 264/293 |
| 5,008,059 | 4/1991 | Kaeufer et al. | 264/296 |
| 5,008,060 | 4/1991 | Kanai et al. | 264/255 |
| 5,106,566 | 4/1992 | McCree | 264/320 |
| 5,211,901 | 5/1993 | Fray | 264/320 |
| 5,238,642 | 8/1993 | Benquet et al. | 264/294 |
| 5,354,531 | 10/1994 | Gumbert | 264/320 |

*Primary Examiner*—Angela Ortiz
*Attorney, Agent, or Firm*—Skjerven, Morrill, MacPherson, Franklin & Friel LLP; Thomas S. MacDonald

[57] ABSTRACT

Provided is a method for crimping a thermoplastic member which allows a first member made of thermoplastic resin to be mounted on a second member at a high mounting strength without complicating the fabrication process and without causing any reduction in the production efficiency. After an entire portion of the first member that is to be crimped is thermally melted or softened, the portion is deformed and crimped by using a crimping die having a die surface which is at a temperature lower the melting point of the thermoplastic resin. Therefore, the deformed portion is given with a uniform internal structure free from internal defects such as cracks and interfaces. Because the interior of the crimped portion remains to be hot as compared to the surface portion which is in contact with the crimping die during the crimping process, a certain pattern of internal stress is produced in the internal part which opposes the internal stress of the surface portion as the deformed portion cools and contracts. Therefore, warping of the crimped portion can be avoided, and the thermoplastic resin member can be mounted on the second member at a high mounting strength without complicating the fabrication process and without causing any reduction in the production efficiency.

6 Claims, 14 Drawing Sheets

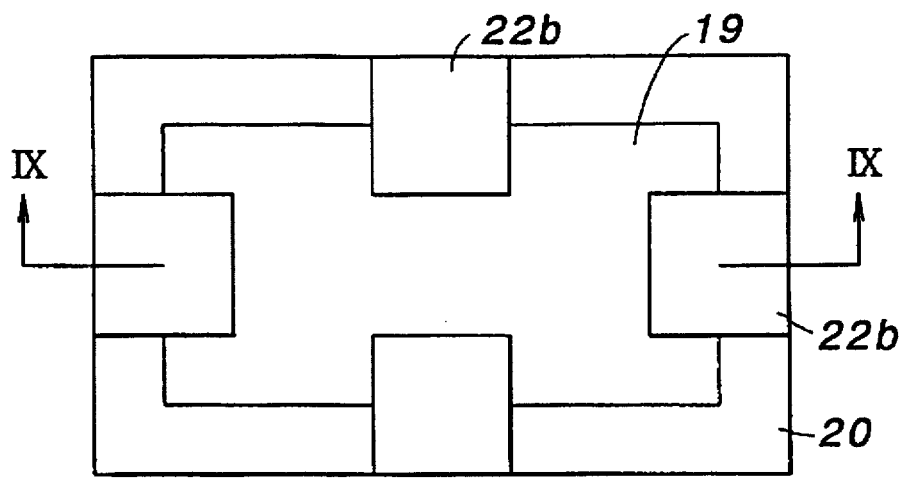
*Fig. 8*a
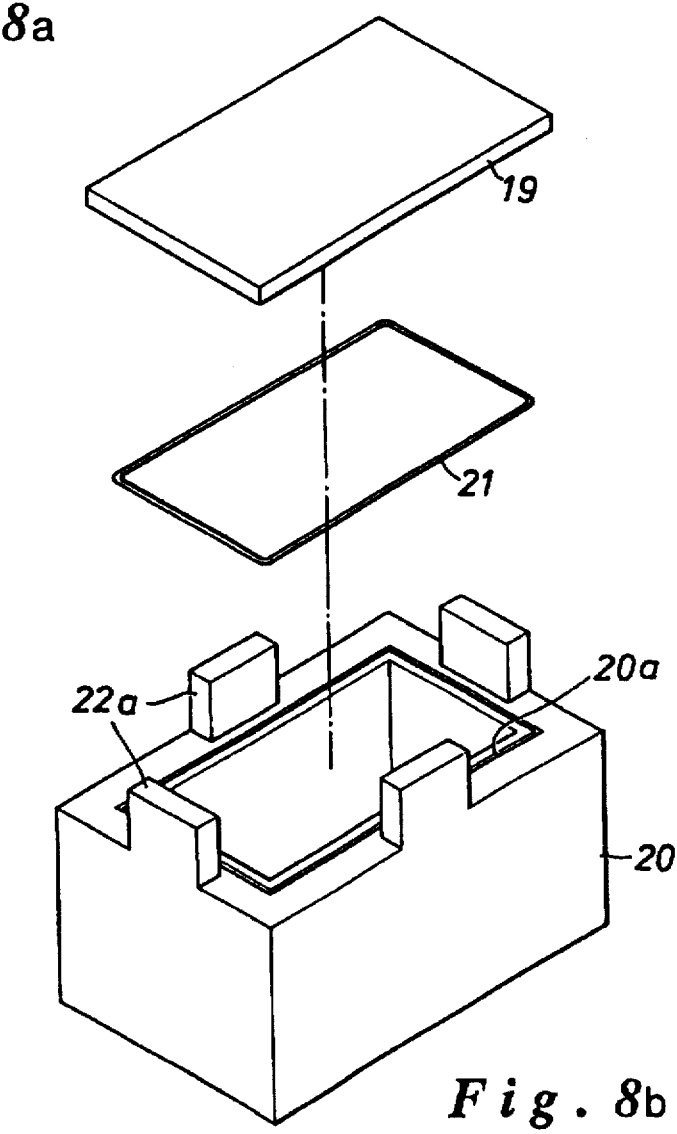
*Fig. 8*b

METHOD FOR CRIMPING A THERMOPLASTIC RESIN MEMBER

This application is a continuation of application Ser. No. 08/217,585, filed Mar. 24, 1994, now abandoned.

TECHNICAL FIELD

The present invention relates to a method for mounting a member made of thermoplastic resin on another member by crimping a part of the thermoplastic resin member, and an assembly made by this method.

BACKGROUND OF THE INVENTION

It has been conventionally known to mount a member made of thermoplastic resin on another member by crimping a part of the thermoplastic resin member, for instance, for mounting a ball seat made of plastic material on a housing in a ball joint assembly, attaching a clip seat made of plastic material to a sheet spring clip, embedding a metallic electrode in a molded member, and securing a reinforcement plate to a flange of a molded member.

For instance, as illustrated in FIG. 10, when mounting a solid cylindrical member 1 made of thermoplastic resin material on a plate member 2 at one of its longitudinal ends, a cylindrical projection 1a provided at the longitudinal end of the solid cylindrical member 1 and having a reduced diameter so as to serve as a portion to be crimped is fitted into a hole 2a provided in the plate member 2, and a crimping die 3 is pressed against this cylindrical projection 1a in the direction indicated by arrow A so that the cylindrical projection 1a is deformed so as to conform to a recess 3a of the crimping die 3 and thus form a crimped head portion 1a'.

Referring to FIG. 10, various methods of crimping (insert molding, cold crimping, hot crimping, thermal crimping, and ultrasonic crimping) were tested by using a cylindrical member 1 made of polyacetal copolymer thermoplastic resin having a projection 1a 4 mm in diameter which is intended to be formed with a head portion 1a' 6 mm in outer diameter and 1.5 mm in height, in combination with a plate member 2 made of a steel plate having a sufficient rigidity. The results of the test are given in the following.

When the plate member 2 is fixedly secured and the cylindrical member 1 is pulled in the direction indicated by arrow B as illustrated in FIG. 10, the mechanical strength of the crimped portion (tensile rupture strength) can be theoretically given by the smaller one of the values given by the following two equations.

Shear rupture strength = area of shear stress × shear strength of the material
= 4 mm × π × 1.5 mm × 5.4 kgf/mm²
≈ 102 kgf Tensile rupture strength = area of tensile stress × tensile strength of the material
= (4 mm/2)² × π × 6.2 kgf/mm²
≈ 78 kgf Because the actual mechanical strength is normally less than the theoretical value due to stress concentration and other reasons, it is anticipated that the part having the diameter of 4 mm will rupture when a tensile load of slightly less than 78 kgf is applied.

The method of injection molding was tested. A plate member 2 was placed in a metallic die for injection molding and molten resin under pressure was injected into the cavity of this metallic die for securely attaching the molded resin member onto the metallic plate upon completion of the process of injection molding. This method is normally called as insert molding, and is not normally considered as a method of crimping. However, in this disclosure, the method of insert molding is treated as a method of crimping. According to the test, the obtained tensile strength was 68 to 74 kgf which is approximately 90% of the theoretical strength. This owes to the fact that the resin material was completely melted during the process of molding, and the resulted resin member had a uniform internal structure.

However, this method may not be suitable when the other member (target member) on which the thermoplastic resin member in question is to be crimped is not suitable to be placed in the metallic die due to its material or other reasons attributed to yet other members associated with it. Furthermore, if there are any dimensional fluctuations in the target member, the molten resin may be filled into the gap between the target member and the metallic die, and this may create unacceptably large burrs or flashes. Depending on the shape and dimensions of the target member, the number of the pieces forming the metallic die for insert molding and the number of fabrication steps may increase to such an extent that the reduction in production efficiency and the increase in the fabrication cost may become unacceptably high.

The method of cold crimping was tested. While the cylindrical member 1 and the plate member 2 shown in FIG. 10 were both at the room temperature or below the melting point of the resin material, the projection 1a was deformed by the pressure applied by a crimping die 3 which is also lower in temperature than the melting point of the member 1. As shown in Table 1, a gap of approximately 0.5 mm was produced between the crimped head 1a' and the plate member 2, and the tensile strength was only approximately 15 to 31 kgf which is only approximately 30% of the theoretical strength. Furthermore, there were other problems such as noises due to the existence of plays in the finished assembly, and reduced durability.

It is believed that the gap was produced between the crimped head 1a' and the plate member 2 because some residual stress was produced inside the resin member 1 as a result of the plastic deformation which took place under normal temperature, and this caused an elastic spring back. Additionally, excessive strain during the plastic deformation may have caused internal defects such as cracks in the crimped head, and this may also have reduced the tensile rupture strength.

The method of hot crimping was tested. The cylindrical member 1 was entirely placed in a temperature controlled oven as a preliminary heating step, and was thereafter promptly combined with the plate member 2 as illustrated in FIG. 10. According to this method, because the resin member 1 was at a high temperature when thermally deforming the projection 1a with a low temperature crimping die 3, the internal stress produced during the plastic deformation was minimal. However, in reality, a gap of approximately 0.3 mm was produced between the crimped head portion 1a' and the plate member 2, and the tensile rupture strength was only approximately 35% of the theoretical value as shown in Table 2. Thus, there was no substantial improvement over the method of cold crimping.

TABLE 1

| heating tem. (°C.) | — | — |
|---|---|---|
| crimping die temp. (°C.) | room | 100 |
| pressure (kgf) | 200 | 200 |
| gap (mm) | 0.52–0.55 | 0.35–0.44 |
| rupture load (kgf) | 18–31 | 15–28 |
| efficiency (%) | 31% ± 8% | 28% ± 8% |

TABLE 2

| heating tem. (°C.) | 80 | 100 | 120 | 120 |
|---|---|---|---|---|
| crimping die temp. (°C.) | room | room | room | 100 |
| pressure (kgf) | 120 | 120 | 120 | 120 |
| gap (mm) | 0.33–0.40 | 0.31–0.38 | 0.30–0.36 | 0.25–0.32 |
| rupture load (kgf) | 21–35 | 17–36 | 24–33 | 16–35 |
| efficiency (%) | 36% ± 9% | 34% ± 12% | 37% ± 6% | 33% ± 12% |

A better result might be expected if the temperature of the preliminary heating step were raised close to the melting point of the resin member (approximately 160° C. in the case of polyacetal copolymer), but raising the temperature of the entire molded member may cause undesirable deformation of other parts of the cylindrical member during the step of preliminary heating and during the step of combining it with other members.

The method of thermal crimping was tested. While both the cylindrical member 1 and the target member 2 were either at the room temperature or a temperature lower than the melting point of the resin, the projection 1a was melted and deformed by a crimping die 3 at a temperature higher than the melting point of the member 1. As shown in Table 3, there was a gap of approximately 0.2 mm between the crimped head portion 1a' and the plate member 2, and the tensile rupture strength was approximately 45% of the theoretical value, a slight improvement over the method of hot crimping.

The crimped head portion 1a' thus formed is shown in the enlarged sectional view of FIG. 14.

However, according to the thermal crimping, as illustrated in FIG. 11, applying a heated crimping die 3 onto the projection 1a causes the material of the projection 1a to melt at a contact surface 1b between the projection 1a and the crimping die 3, and to start to flow downwards and outwards. Because the melting of the material is limited to the area of contact between the projection 1a and the crimping die 3, there will be an interface 1c between the melted part and the unmelted part of the projection 1a as illustrated in FIGS. 12 and 13. Thus, when the cylindrical member 1 is subjected to a load in the direction indicated by arrow B, the barely connected part 1d will readily rupture, thereby reducing the mechanical strength to a level substantially below the theoretical value.

It is conceivable to eliminate this interface 1c by keeping the crimping die 3 applied for a sufficiently long time to melt the projection 1a all the way into its interior. However, when subjected to such a heat over an extended time period, the material of the projection 1a may be chemically affected, and there will be a problem in avoiding adverse consequences. Furthermore, the heat will be transmitted also to the target member, and even the target member may be adversely affected by the heat depending on its composition and surface conditions. Keeping the crimping die applied for an extended period of time will slow down the fabrication process, and it will increase the fabrication cost. When the crimping die 3 is removed after the entire projection 1a has been melted, due to the friction between the side surface of the head portion 1a' and the crimping die 3 or the vacuum which may be created therebetween, the final crimped form may deviate from the intended design, and a part of the resin material may adhere to the crimping die, thereby pulling a filament out of the resin material. To avoid the last mentioned problem, it is possible to cool the crimping die after completely melting the projection, and remove it only after the resin material has fully solidified. However, this approach will waste a substantial amount of time and thereby will increase the fabrication cost because the cooling and reheating of the crimping die will mean a substantial added time period on top of the time period required for keeping the crimping die applied.

When the crimping die 3 at a high temperature is removed in FIG. 12, the crimped head portion 1a' is still at a high temperature on its surface but at a low temperature inside. Because a thermoplastic resin has a tendency to shrink upon cooling, the surface of the crimped head portion will be subjected to tensile stress as the crimped portion is cooled to the room temperature. As a result, as shown by arrows C and D in FIG. 13, the peripheral part of the crimped portion 1a' is pulled toward the central part and thereby caused to warp upward, and it will produce a gap between the plate member 2 and the crimped portion 1a'. Thus, it can be seen that it would be quite impossible to achieve a thermal crimping without involving gaps unless the above mentioned process involving the steps of complete melting and heating are employed.

The method of ultrasonic crimping was tested. While both the cylindrical member 1 and the plate member 2 of FIG. 10 were at the room temperature, a crimping die 3 attached to the horn of an ultrasonic welder is applied to the projection 1a, and the ultrasonic welder was activated. The heat generated by the friction resulting from ultrasonic oscillation causes the projection 1a to locally melt and deform. As shown in Table 4, this method did not demonstrate any advantage over the thermal crimping in terms of the gap between the crimped head portion 1a' and the plate member 2, and the tensile rupture strength.

TABLE 3

| crimping die temp. (°C.) | 240 | 259 | 260 |
|---|---|---|---|
| pressure (kgf) | 40 | 40 | 40 |
| retaining time (sec) | 10 | 10 | 10 |
| gap (mm) | 0.18–0.27 | 0.17–0.25 | 0.20–0.31 |
| rupture load (kgf) | 29–44 | 27–37 | 23–39 |
| efficiency (%) | 47% ± 10% | 41% ± 6% | 40% ± 10% |

TABLE 4

| horn oscillation amp. (μm) | 60 | 60 | 60 |
|---|---|---|---|
| pressure (kgf) | 30 | 40 | 30 |
| application time (sec) | 1.5 | 1.2 | 2.0 |
| gap (mm) | 0.15–0.23 | 0.18–0.21 | 0.13–0.25 |
| rupture load (kgf) | 26–34 | 13–27 | 18–33 |
| efficiency (%) | 38% ± 5% | 26% ± 9% | 33% ± 10% |

The method of ultrasonic crimping is not different from the method of thermal crimping in that the resin melts in the interface between the projection 1a and the crimping die 3, and, therefore, cannot produce any better result.

BRIEF SUMMARY OF THE INVENTION

In view of such problems of the prior art, a primary object of the present invention is to provide a method of crimping a thermoplastic member which allows a thermoplastic member to be mounted onto another member with a high mechanical strength.

A second object of the present invention is to provide a method of crimping which allows a secure connection to be made substantially without any play.

A third object of the present invention is to provide a method of crimping which would not complicate the work involved and would not lower the production efficiency.

These and other objects of the present invention can be accomplished by providing a method for mounting a first member made of thermoplastic resin on a second member by crimping a part of the first member, comprising the steps of: selectively heating the part of the first member that is to be crimped until the part to be crimped is substantially entirely melted or softened; and applying a crimping die having a die surface which is at a temperature lower than a melting point of the thermoplastic resin onto the part to to be crimped. Typically, the part to be crimped is selectively heated by placing a heating tool adjacent to the part to be crimped.

According to this method, the melted and deformed part attains a uniform structure without any internal defects such as cracks and interfaces, and the inner part, which is relatively hot as compared to the surface which is in contact with the crimping die during the crimping process, is given with a certain pattern of internal stress which opposes the internal stress produced in the surface region during the cooling process. Thus, a high mechanical strength can be ensured to the crimped portion.

According to a preferred embodiment of the present invention, the crimping die is provided with a cavity for molding the part to be crimped into an enlarged head portion so that the thus crimped head portion is always provided with a same configuration, and the designed mechanical strength may be ensured at all times. In particular, if the cavity is provided with a piston received in the cavity so as to be slidable into and out of the cavity, the crimped head portion can be formed as designed even when the second member has some dimensional errors.

If the second member is required to be protected from the heat of the heating tool, a heat insulating member may be placed on the second member to protect the second member from the heat of the heating tool.

According to a particularly preferred embodiment of the present invention, the method comprises the steps of: passing a projection provided on a first member made of thermoplastic resin through a hole provided in a second member; heating the projection with a heating tool placed close to the projection until the projection is softened or melted without substantially heating other parts of the first member; and applying a crimping die, having a die surface which is at a temperature lower than a melting point of the thermoplastic resin, onto the projection.

BRIEF DESCRIPTION OF THE DRAWINGS

Now the present invention is described in the following with reference to the appended drawings, in which:

FIGS. 8(a) and 8(b) are a plan view and an exploded perspective view showing a third embodiment of the present invention;

DETAILED DESCRIPTION OF THE PREFERRED EMBODIMENTS

Now the preferred embodiments of the present invention are described in the following with reference to the appended drawings.

Figure 1:
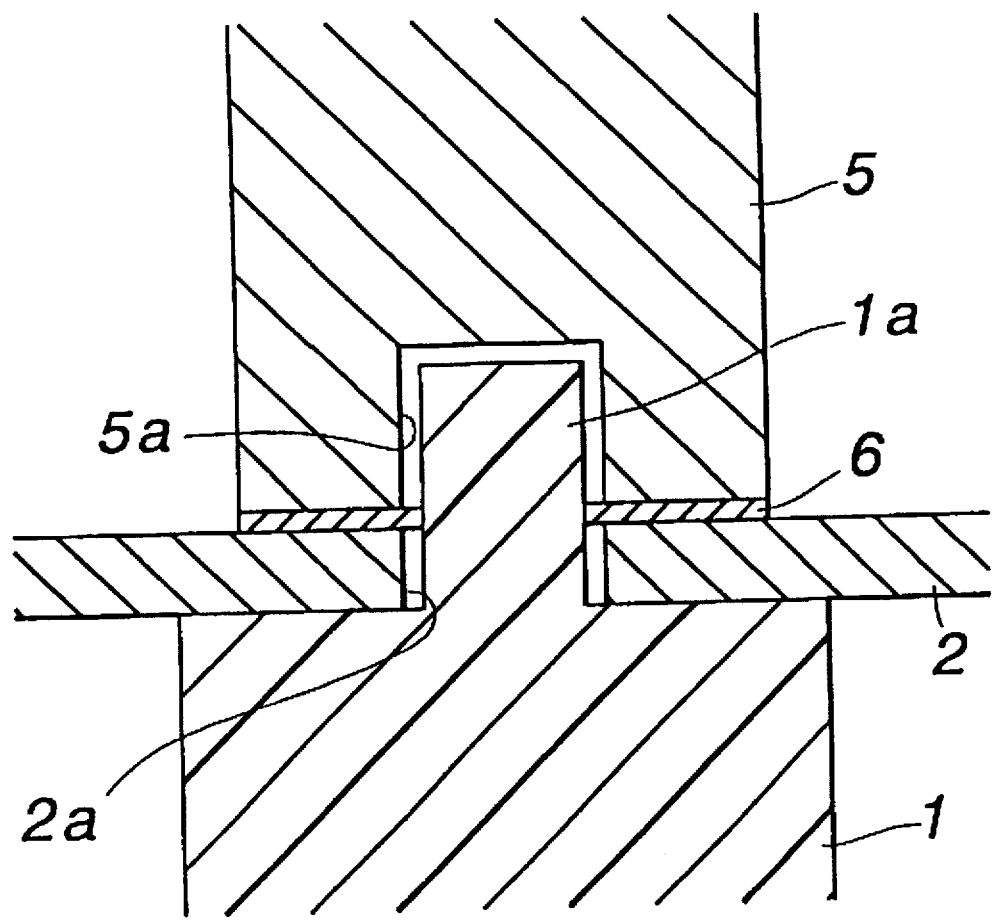
FIG. 1 is a sectional view of a heating device in a first embodiment of the present invention.
Figure 2:
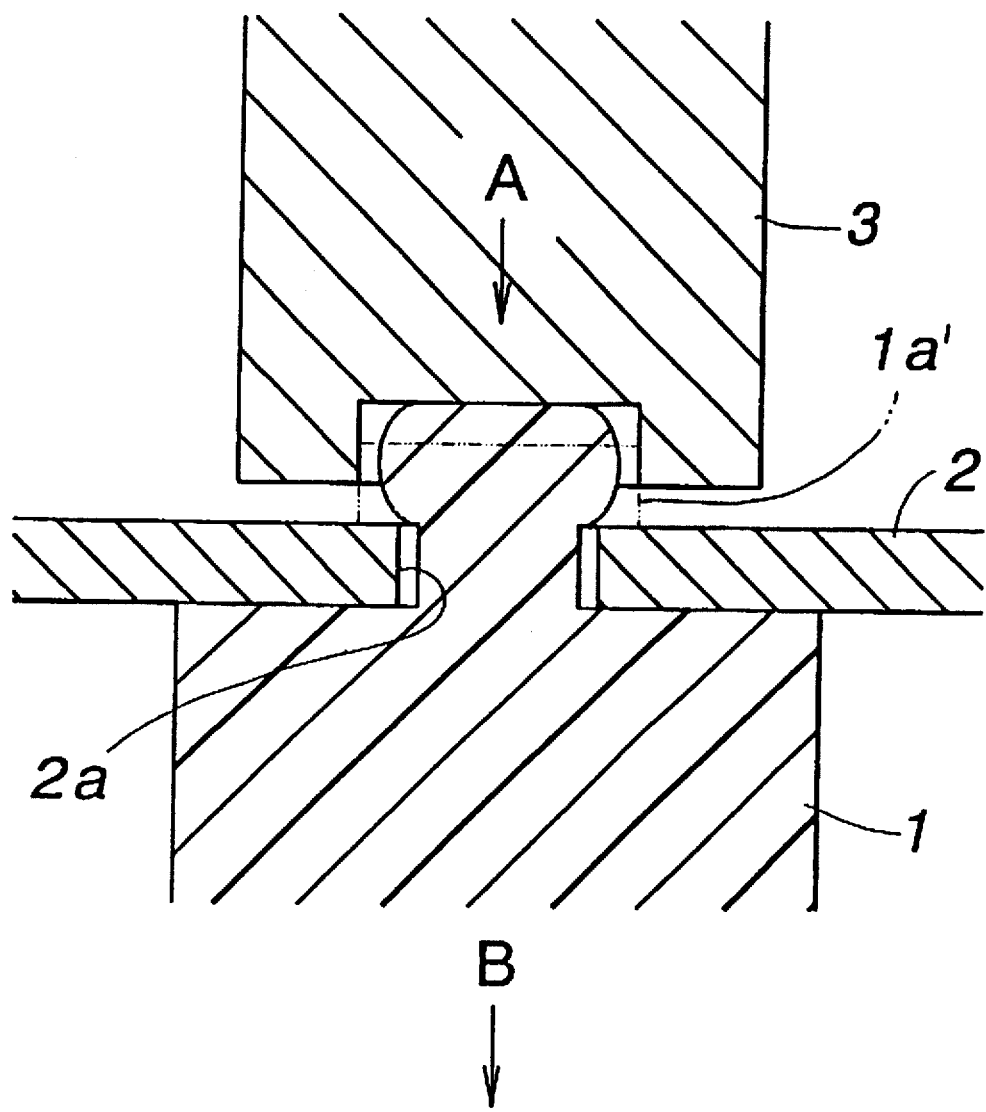
FIG. 2 is a view showing the procedure of crimping according to the first embodiment of the present invention.
Figure 10:
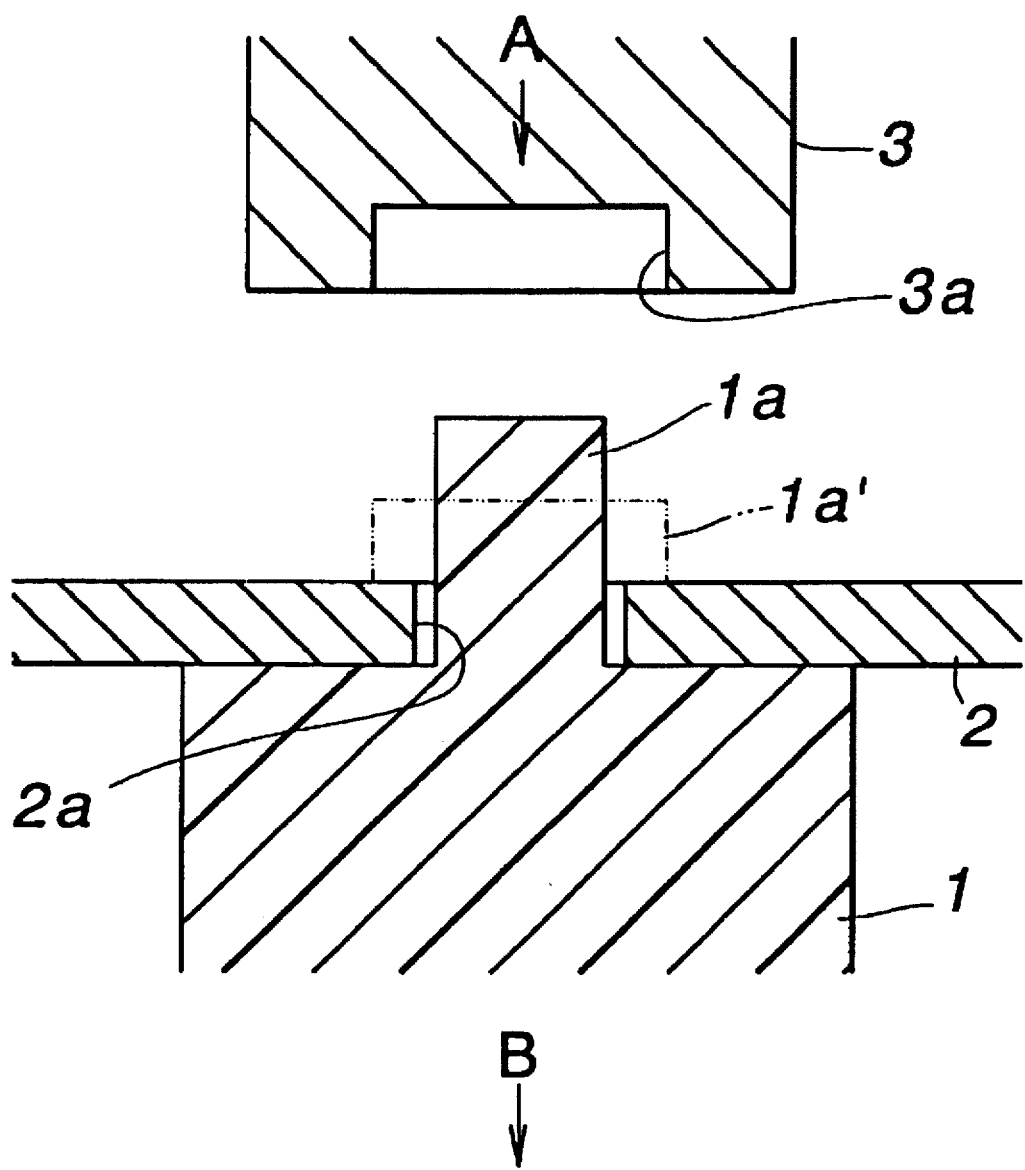
FIG. 10 is a sectional view of a conventional crimping device.
Figure 11:
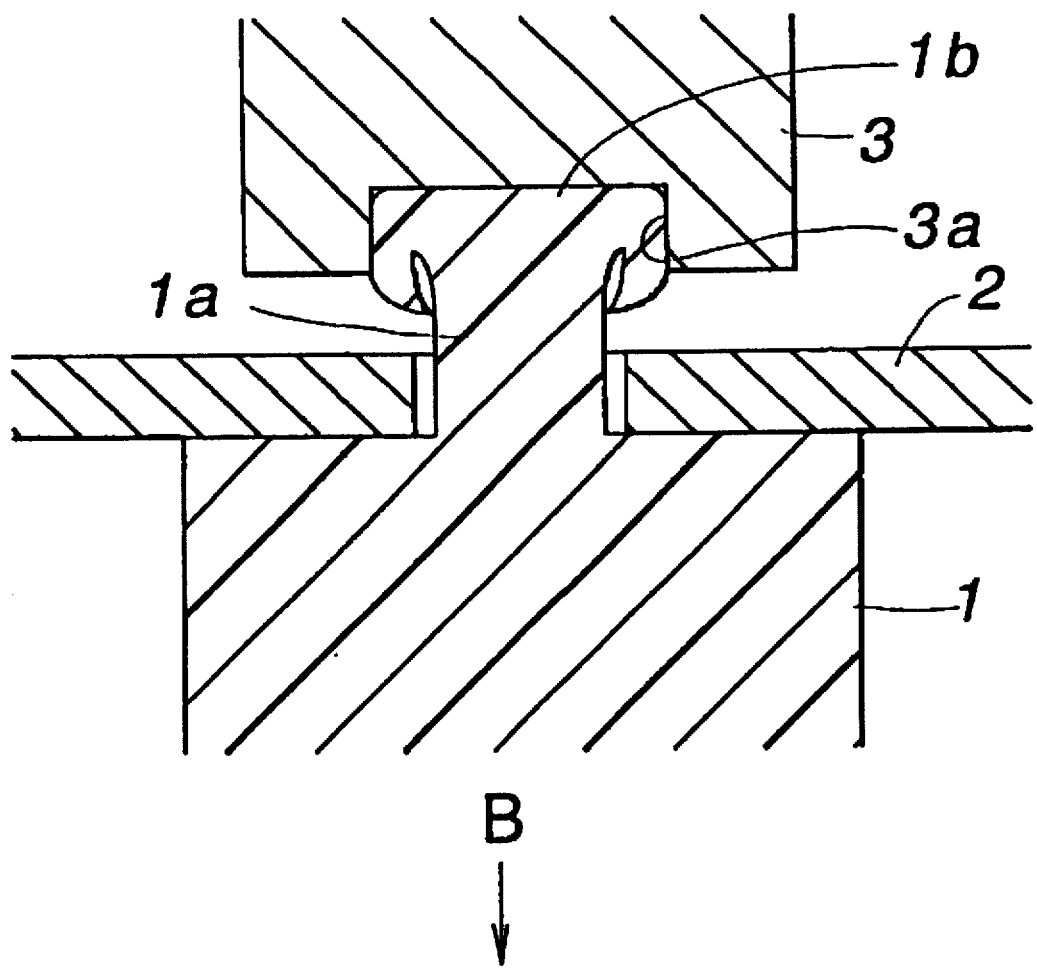
FIGS. 11 through 13 are views similar to FIG. 8 showing different steps of the conventional procedure for crimping.
Figure 12:
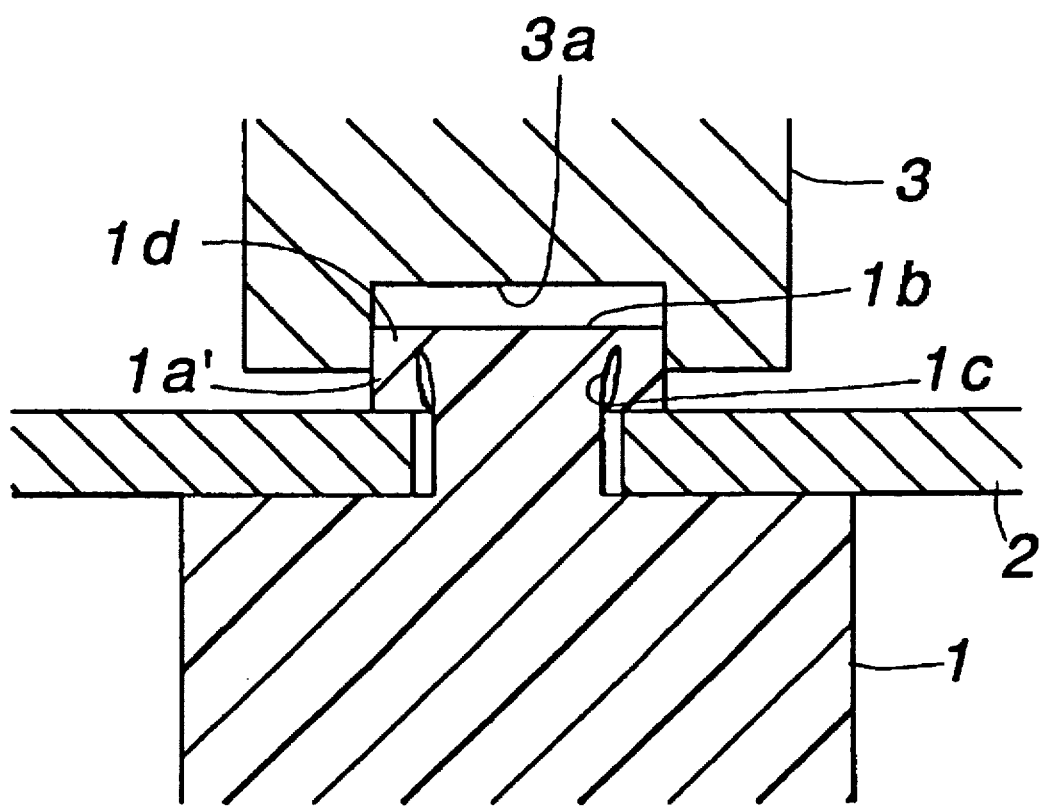
Figure 13:
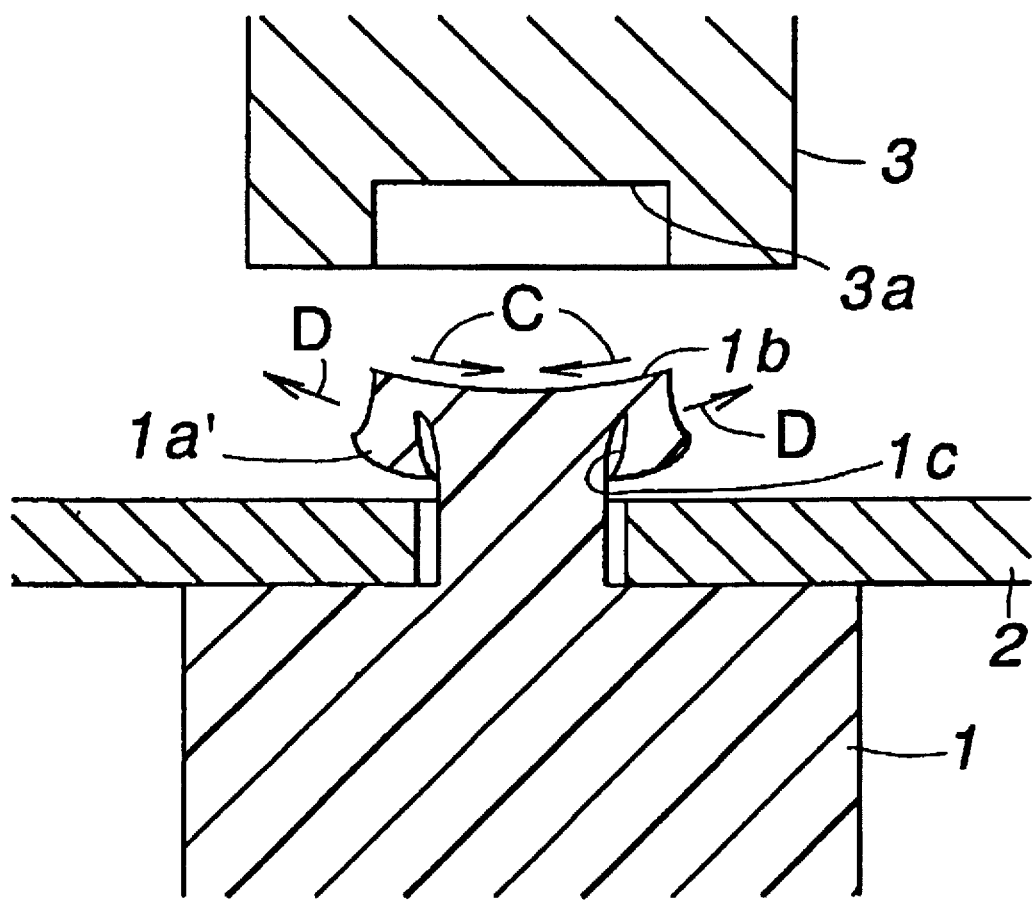
Figure 14:
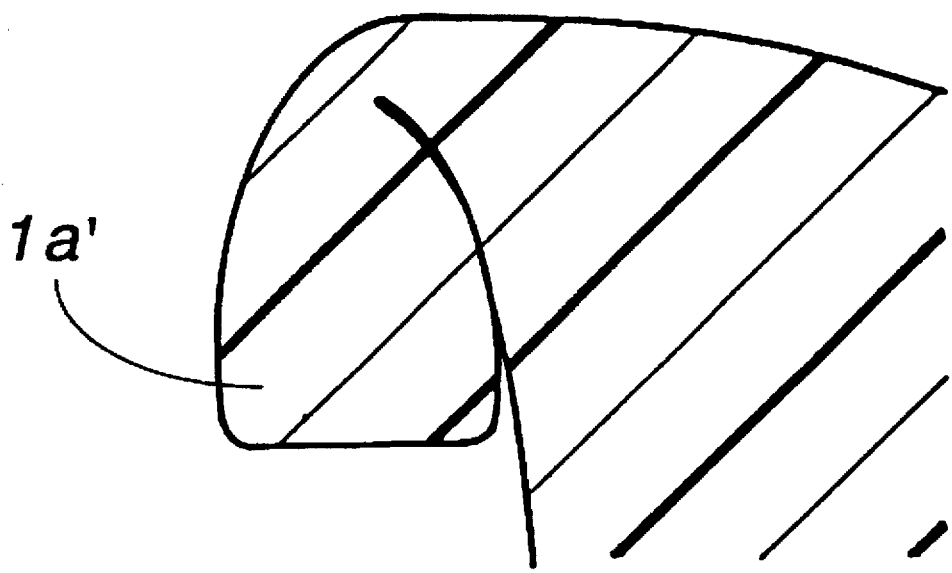
FIG. 14 is an enlarged sectional view of the crimped portion upon completion of crimping according to the conventional method of crimping.

FIGS. 1 and 2 show a sectional view of a crimping device given as a first embodiment of the present invention. This embodiment is applied to the situation in which an end portion of a cylindrical member 1 made of thermoplastic resin material is to be crimped onto a plate member 2 as was the case in the example shown in FIG. 10.

An end surface of this cylindrical member 1 is provided with a cylindrical projection 1a of a reduced diameter, and the plate member 2 is provided with a hole 2a for receiving this cylindrical projection 1a.

For the purpose of comparing with the conventional methods of crimping, the projection 1a measured 4 mm in diameter, and was intended to be formed with a crimped head 1a' 6 mm in outer diameter and 1.5 mm in height. The cylindrical member 1 was made of polyacetal copolymer thermoplastic resin, and the plate member 2 was made of a steel plate having a sufficient rigidity.

Now the procedure for mounting the thermoplastic member 1 onto the target member 2 by using the method of crimping according to the present invention is described in the following.

First of all, with the projection 1a of the thermoplastic resin member 1 passed through the hole 2a of the target member 2, a heating tool 5 provided with a cavity 5a conforming to the shape of the projection 1a is heated to a temperature higher than the melting point of the resin (polyacetal copolymer) of the thermoplastic resin member 1, and is placed as close to the projection 1a as possible without contacting it (with a radial gap of 0.3 mm in this embodiment) so that the projection 1a may be entirely heated by thermal radiation from the heating tool 5. It is also possible to use hot air or far infrared radiation for heating the projection 1a as a preliminary heating step. It is also possible to simply soften the projection 1a instead of completely melting it.

After heating the projection 1a without substantially changing its shape, the projection 1a is pressed in the direction indicated by arrow A and deformed by using a crimping die 3 at the room temperature or a temperature lower than the melting point of the resin as illustrated in FIG. 2 so that a crimped head 1a' of a desired shape may be obtained. Because the temperature of the crimping die 3 is low and the resin material of the projections 1a rapidly solidifies, there is no need to keep the crimping die 3 applied for any extended period of time.

Figure 5:
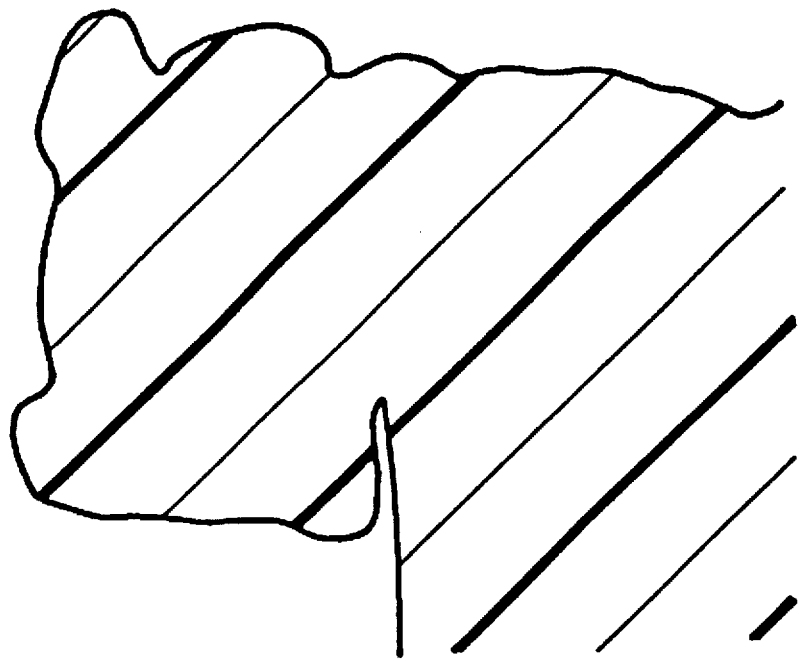
FIG. 5 is an enlarged sectional view of the crimped portion upon completion of crimping according to the first embodiment of the present invention.

Table 5 shows the results of the test conducted on the thus crimped specimen to determine the tensile rupture strength of the crimped head portion 1a' when the cylindrical member 1 is pulled in the direction indicated by arrow B while the plate member 2 is fixed. There was a slight gap between the crimped head portion 1a' deformed from the projection 1a and the plate member 2, but was mostly below the lower limit of the measurable range. The tensile rupture strength was more than 70% of the theoretical value, a significant improvement over the conventional methods of crimping. The thus produced crimped head 1a' is shown in the enlarged sectional view of FIG. 5.

TABLE 5

| prelim. heating temp. (°C.) | 210 | 210 | 210 | 230 | 230 |
|---|---|---|---|---|---|
| prelim. heating time. (sec) | 30 | 60 | 90 | 30 | 60 |
| retaining time (sec) | 10 | 10 | 10 | 10 | 10 |
| gap (mm) | 0.15–0.20 | 0.12–0.14 | 0.08–0.10 | 0.11–0.11 | 0.10–0.11 |
| rupture load (kgf) | 50–55 | 51–52 | 54–56 | 52–56 | 50–53 |
| efficiency (%) | 67% ± 4% | 66% ± 1% | 71% ± 2% | 69% ± 2% | 66% ± 2% |
| prelim. heating temp. (°C.) | 230 | 250 | 250 | 250 | |
| prelim. heating time (sec) | 90 | 30 | 60 | 90 | |
| retaining time (sec) | 10 | 10 | 10 | 10 | |
| gap (mm) | 0.05–0.06 | 0.10–0.10 | 0.07–0.11 | * | |

TABLE 5-continued

| rupture load (kgf) | 56–57 | 52–59 | 58–59 | 63–67 |
|---|---|---|---|---|
| efficiency (%) | 72% ± 1% | 71% ± 4% | 75% ± 10% | 83% ± 2% |

*below measurable limit

According to this embodiment, because the entire projection 1a melts and is thereafter upsetted as opposed to the conventional methods, there is no interface between the melted and unmelted parts, and a stable mounting strength can be obtained. Because the crimping die 3 is lower in temperature than the melting point of the resin material, the surface of the crimped head portion 1a' solidifies before the interior thereof solidifies, there is no warping as opposed to the method of thermal crimping, and, instead, a pattern of internal stress is produced which tends to contract the projection 1a. Therefore, the plate member 2 is secured from two sides, and the two members can be joined together substantially without any gap between them.

According to this embodiment, a certain time period for preliminary heating is required, but, in practice, because the heating tool is not required to be brought into contact with the member 1, it is possible to reduce the production cycle time by providing a plurality of stations each having a similar heating tool and heating each projection sequentially in these stations.

When the plate member 2 is desired to be kept away from the influence of heat, an insulating member 6 may be placed between the heating tool 5 and the plate member 2 as shown in FIG. 1.

Figure 3:
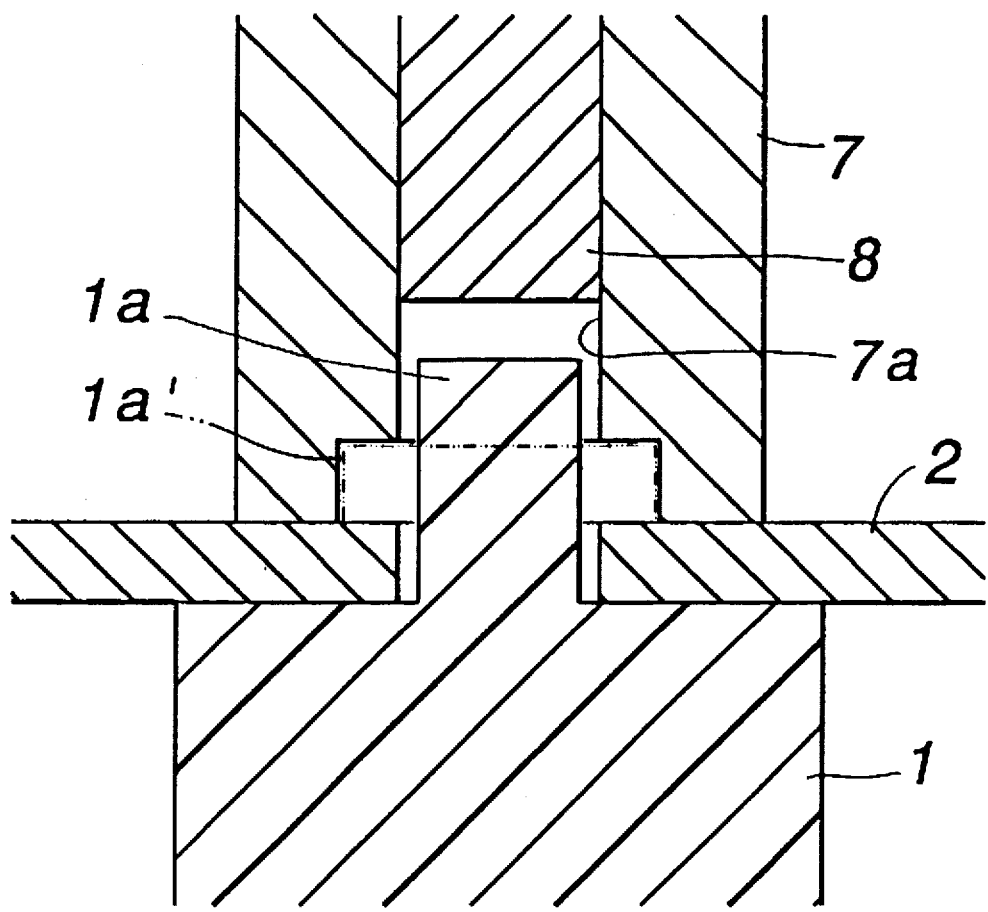
FIG. 3 is a sectional view of a crimping die in a second embodiment of the present invention.
Figure 4:
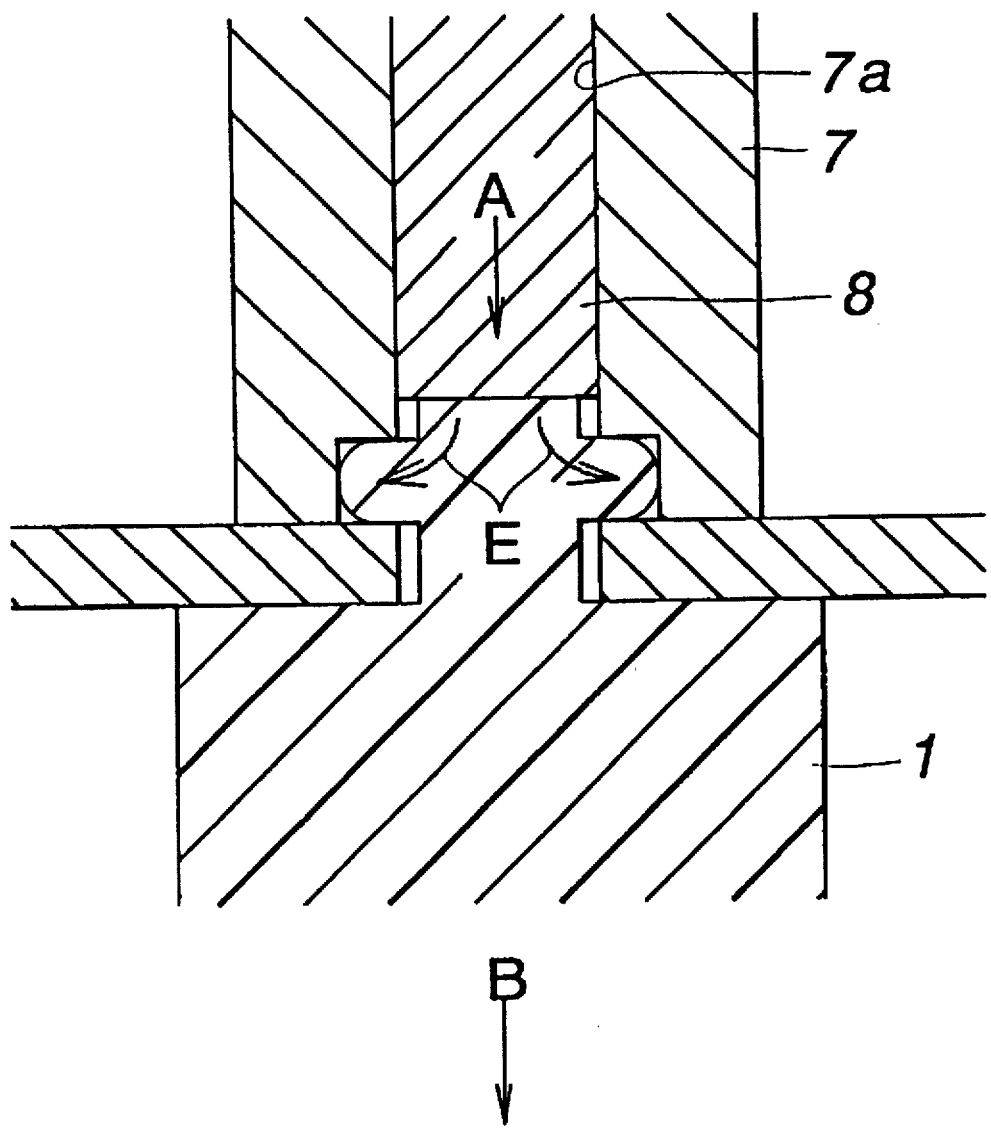
FIG. 4 is a view similar to FIG. 3 showing the procedure of crimping according to the second embodiment of the present invention.

FIGS. 3 and 4 are sectional views similar to FIGS. 1 and 2 showing a second embodiment of the present invention. In this embodiment, a cavity 7a having a slightly larger diameter (with a radial gap of 0.3 mm in this experiment) than the resin projection 1a is centrally provided in the crimping die 7, and a piston 8 is slidably received in this cavity 7a. This crimping die 7 is otherwise similar to the crimping die 3 of the first embodiment.

Now the procedure for mounting the thermoplastic member 1 onto the target member 2 by using the method of crimping according to this embodiment is described in the following. First of all, in a similar manner as the first embodiment, with the projection 1a of the thermoplastic resin member 1 passed through the hole 2a of the target member 2, the entire projection 1a is heated and melted with the thermal radiation from the heating tool 7. Then, as illustrated in FIG. 3, the projection 1a is inserted in the cavity 7a of the crimping die 7 at the room temperature or a temperature lower than the melting point of the resin material, and the piston 8 is moved in the direction indicated by arrow A (FIG. 4) so that the projection 1a is pressurized and deformed into the prescribed crimped shape.

This embodiment is suitable for achieving a higher mechanical strength than the first embodiment. The cavity 7a of the crimping die 7 controls the direction of the flow of the resin in the direction indicated by arrow E with the result that a lower part of the projection 1a expands radially.

Figure 6:
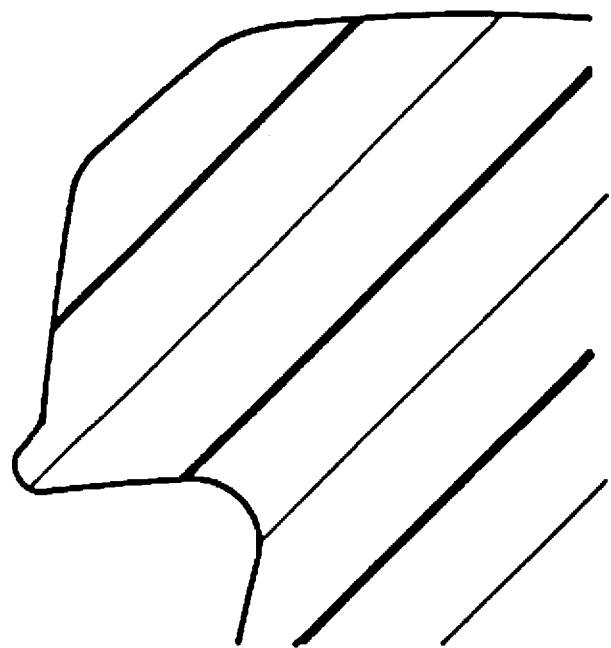
FIG. 6 is an enlarged sectional view of the crimped portion upon completion of crimping according to the second embodiment of the present invention.

Table 6 shows the results of the test conducted on the thus crimped specimen to determine the tensile rupture strength of the crimped head portion 1a' when the cylindrical member 1 is pulled in the direction indicated by arrow B while the plate member 2 is fixed. The gap between the crimped head portion 1a' deformed from the projection 1a and the plate member 2 was below the measurable range, and the tensile rupture strength was more than 80% of the theoretical value, which is comparable to the result obtained by insert molding. As can be seen from FIG. 6 showing the thus produced crimped head 1a' in an enlarged sectional view, there were substantially no internal defects.

TABLE 6

| | | | | | |
|---|---|---|---|---|---|
| prelim. heating temp. (°C) | 170 | 170 | 170 | 210 | 210 |
| prelim. heating time. (sec) | 30 | 60 | 90 | 30 | 60 |
| retaining time (sec) | 10 | 10 | 10 | 10 | 10 |
| gap (mm) | below measurable limit | | | | |
| rupture load (kgf) | 48–62 | 53–69 | 57–65 | 55–69 | 62–70 |
| efficiency (%) | 71% ± 9% | 78% ± 10% | 78% ± 5% | 79% ± 9% | 85% ± 5% |
| prelim. heating temp. (°C) | 210 | 250 | 250 | 250 | |
| prelim. heating time. (sec) | 90 | 30 | 60 | 90 | |
| retaining time (sec) | 10 | 10 | 10 | 10 | |
| gap (mm) | below measurable limit | | | | |
| rupture load (kgf) | 65–71 | 65–70 | 61–70 | 63–72 | |
| efficiency (%) | 87% ± 4% | 87% ± 3% | 84% ± 6% | 87% ± 6% | |

According to the first embodiment using the crimping die 3 not equipped with a piston, the pressurization by the crimping die 3 stops when it comes into contact with the target member (plate member), but the present embodiment allows the crimping process to be carried out with the pressure by the piston 8 kept constant without regard to the fluctuations in the volume of the projection 1a. Therefore, generations of burrs or flashes can be avoided, and any incomplete crimping can be prevented. Thus, even in mass production, the mechanical strength can be easily controlled within an acceptable range.

Figure 7:
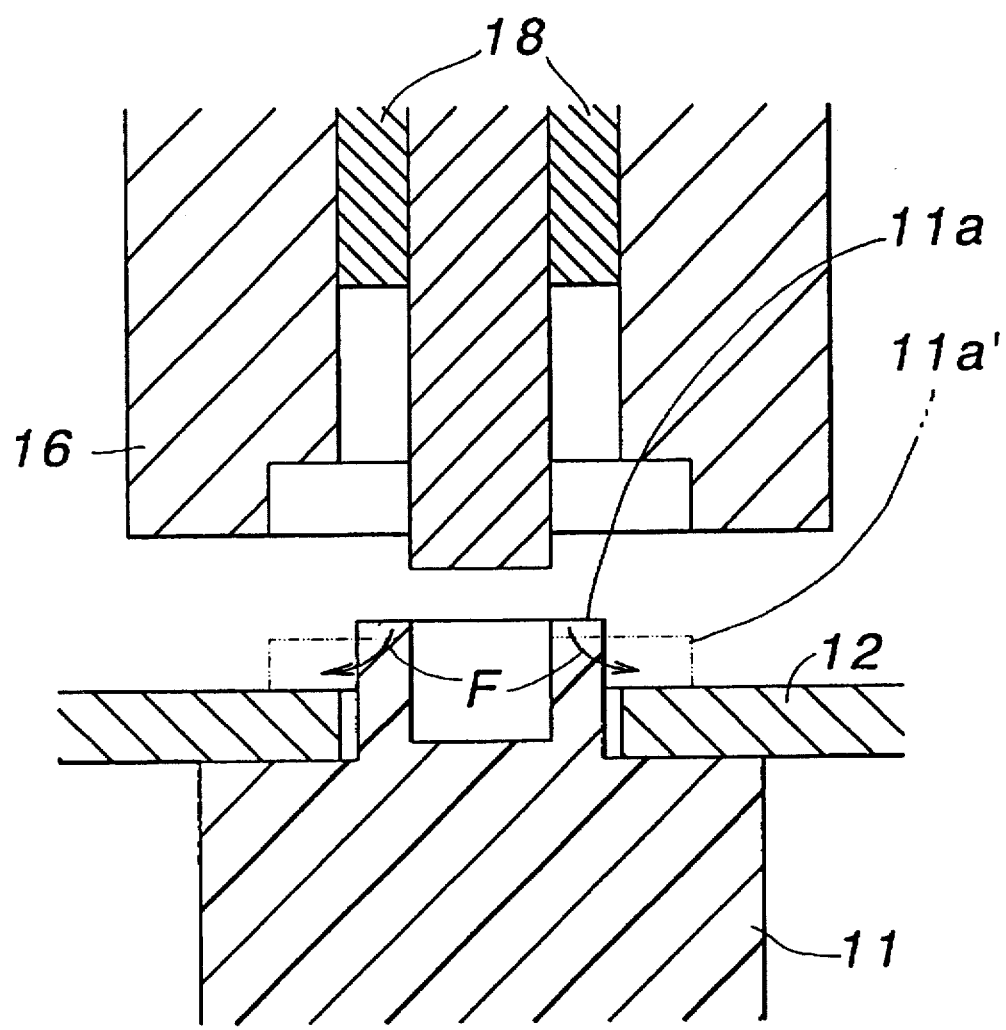
FIG. 7 is a view similar to FIG. 3 showing a modification of the second embodiment of the present invention.
Figure 9:
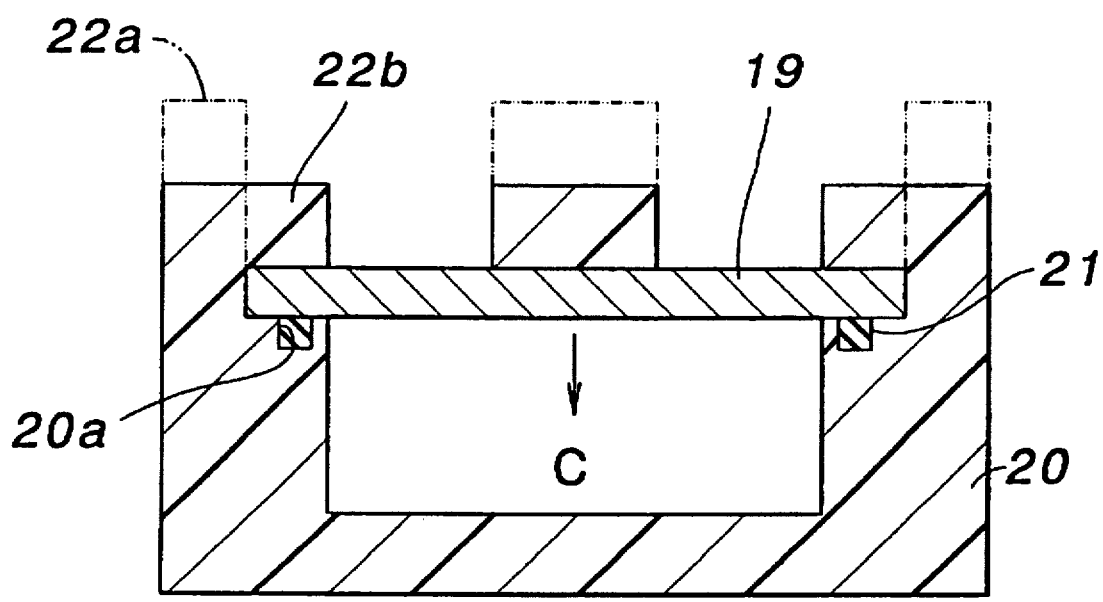
FIG. 9 is a sectional view taken along line IX—IX of FIG. 8(a)

It is obvious that the shape of the resin material to be crimped may take other forms such as annular shapes as illustrated in FIGS. 7, 8 and 9. In FIG. 7, numeral 11 denotes a thermoplastic resin member, numeral 12 denotes a target member or a plate member, numeral 16 denotes a crimping die, numeral 18 denotes a pressurization piston slidably received inside the crimping die, numeral 11a denotes a projection for crimping, and numeral 11a' denotes a crimped head portion after the molten resin has flown as indicated by arrow F.

FIGS. 8(a) and 8(b) show a third embodiment of the present invention in which a metallic plate (second member) 19 is mounted on a rectangular box-shaped thermoplastic resin member (first member) having an open upper end. Numeral 21 denotes a seal member received in an annular recess 20a provided in the upper peripheral surface of the first member 20. The first member 20 is provided with four projections 22a on its upper surface. By crimping these projection 22a, by using a suitable heating tool and a crimping die, into the crimped head portions 22b according to the method of the present invention, the metallic plate 19 is subjected to a load directed as indicated by arrow C, and the seal member 21 is pressed into the recess 20a as shown in FIG. 9 so as to achieve an air-tight chamber inside the first member 20.

As can be understood from the above description, according to the method of crimping of the present invention, after an entire portion of the thermoplastic resin member that is to be crimped is thermally melted or softened, the portion is deformed and crimped by using a crimping die having a die surface which is at a temperature lower the melting point of the thermoplastic resin. Therefore, the deformed portion is given with a uniform internal structure free from internal defects such as cracks and interfaces. Because the interior of the crimped portion remains to be hot as compared to the surface portion which is in contact with the crimping die during the crimping process, a certain pattern of internal stress is produced in the internal part which opposes the internal stress of the surface portion as the deformed portion cools and contracts. Therefore, warping of the crimped portion can be avoided, and the thermoplastic resin member can be mounted on the target member at a high mounting strength without complicating the fabrication process and without causing any reduction in the production efficiency.

Although the present invention has been described in terms of preferred embodiments thereof, it is obvious to a person skilled in the art that various alterations and modifications are possible without departing from the scope of the present invention which is set forth in the appended claims.

What we claim is:

1. A method for securely mounting a first member made of thermoplastic resin onto a second member having a first surface and an opposite second surface by crimping a part of said first member, comprising the steps of:

mounting the first member on said second member;

selectively heating said part of said first member that is to be crimped until said part to be crimped is substantially entirely melted or softened without substantially changing the shape of said part;

then applying a crimping die to said part of said first member, said die having a die surface which is at a temperature lower than a melting point of said thermoplastic resin of said first member; and then deforming said part by operation of said crimping die for securely crimping said first member onto both of said surfaces of said second member wherein the interior of the first member remains hot as compared to the surface portion of the first member being crimped by said die surface such that warping of the crimped first member is avoided.

2. A method according to claim 1, wherein said selectively heating step comprises heating by thermal radiation by placing a heating tool adjacent to but not contacting said part to be crimped.

3. A method according to claim 1, comprising providing a cavity in said crimping die for molding said part to be crimped into an enlarged head position.

4. A method according to claim 3, comprising providing a piston in said die; sliding the piston into said cavity to pressurize and deform said part thereby; and controlling the direction of flow of said part into said cavity for forming said enlarged head portion.

5. A method according to claim 2, further comprising the step of placing a heat insulating member on said second member between said second member and said heating tool to protect said second member from the heat of said heating.

6. A method for mounting a first member made of thermoplastic resin onto a second member having a first side and an opposite second side and a hole extending between said sides, said first member having a projection and a surface extending from the projection, comprising the steps of:

passing the projection through the hole provided in said second member;

heating the projection with a heating tool placed close to but not contacting the projection until the projection is softened or melted by thermal radiation without substantially heating other parts of said first member;

then applying a crimping die onto the projection, the die having a die surface which is at a temperature lower than a melting point of the thermoplastic resin of said first member; and then deforming the projection to crimp said first member projection securely onto said first side of said second member and to force the second side securely onto the surface extending from the projection such that the second member is secured from two sides.

* * * * *